June 26, 1928.
E. S. MIX
BELT ADJUSTING SLIDE
Filed April 25, 1925
1,675,040
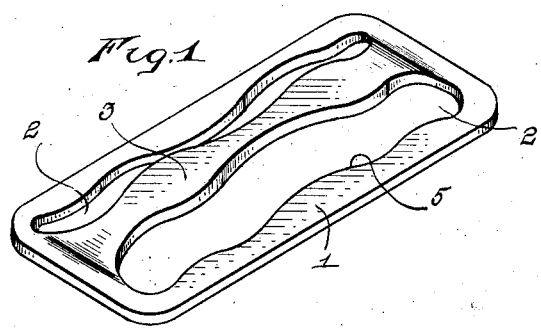
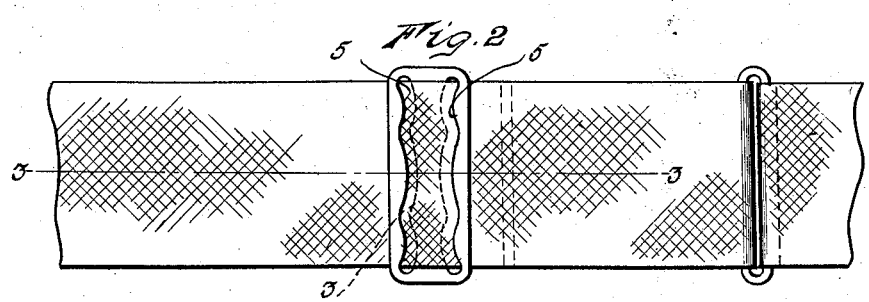
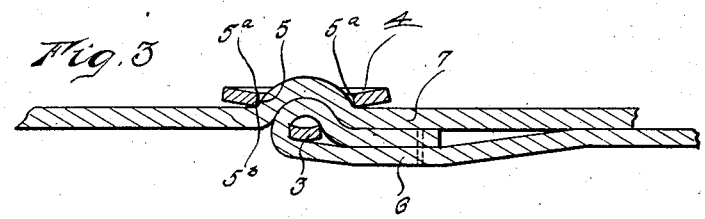
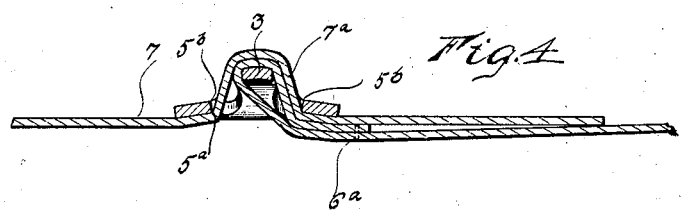
INVENTOR
Edwin S. Mix,
BY
Davis & Simms
his ATTORNEYS Patented June 26, 1928.

1,675,040

UNITED STATES PATENT OFFICE.

EDWIN S. MIX, OF ROCHESTER, NEW YORK, ASSIGNOR TO HICKOK MANUFACTURING COMPANY, INC., OF ROCHESTER, NEW YORK.

BELT-ADJUSTING SLIDE.

Application filed April 25, 1925. Serial No. 25,799.

The present invention relates to belt adjusting slides of a type in which one end of a belt is secured thereto and an intermediate portion of the belt passes through the slide to frictionally engage the secured portion. An object of this invention is to provide a slide which is adapted for use on belts made from material of different thicknesses.

To these and other ends, the invention consists of certain parts and combinations of parts, all of which will be hereinafter described: the novel features being pointed out in the appended claims.

In the drawings:

Fig. 1 is a perspective view of the slide;

Fig. 2 is an outer face view of a fragment of a thick belt with the slide in position thereon;

Fig. 3 is a section on the line 3—3, Fig. 2; and

Fig. 4 is a section similar to Fig. 3, showing the slide secured to a thinner belt and in a reversed position.

Referring to the illustrated embodiment of the invention, 1 indicates a sheet metal plate which is formed with two wave-like slots 2 separated by a bar 3 which is deflected from the plane of the body 1 of the plate. In this way, the opposite sides of the bar are wave-like in shape. That face of the plate opposite the one on which the bar lies is concaved slightly at 4 so that the side walls 5 of the slots lie at slight angles to the plane of the plate. In this way two sharp corners 5$^a$ and 5$^b$ are provided.

The belt end 6 of a thick belt is passed about the anchoring bar 3 on the convex or bar side of the plate and the other or intermediate portion of the belt 7 is then passed through the two slots also on the convex side of the plate. This causes the edges 5$^b$ of the slots to bite into the fabric of the belt and said edges being wave-like tend to produce waves in the material of the belt, all of which acts to prevent the slipping of the belt in the slide. The waves in the intermediate portion of the belt are made more pronounced due to the fact that the anchoring bar 3 has also wave-like edges. When the slide is used as in Fig. 4 the portion 6$^a$ of a thin belt is passed about the bar 3 from the concave side or the side opposite that on which the bar lies and the intermediate portion 7 of the belt is passed about the bar 3 from the concave side of the slot. This arrangement produces more of a deflection in the portion 7, as shown at 7$^a$, and this deflected portion together with the wave-like edges of the walls of the slot tend to prevent any slipping of the portion 7 on the slide, the corners 5$^a$, in this instance, biting into the material.

What I claim as my invention and desire to secure by Letters Patent is:

1. A belt slide comprising a plate of uniform thickness formed with two wave-like slots, each of uniform width throughout its length, forming between them an anchoring bar for one end of the belt, said bar being supported at opposite ends and deflected from the plane of the plate, the waves of the two slots being opposed, and a belt having one end secured about the anchoring bar and having a portion slidable through both slots over that portion of the belt secured about the anchoring bar.

2. A belt slide comprising a plate of uniform thickness formed with two wave-like slots, each of uniform width throughout its length, forming between them an anchoring bar for one end of the belt, said anchoring bar being supported at opposite ends and deflected from the plane of the plate, and the plate having the side opposite the bar concaved, the waves of the two slots being opposed, and a belt having one end secured about the anchoring bar and having a portion slidable through both slots over that portion of the belt secured about the anchoring bar.

3. A belt slide comprising a plate of sheet metal of uniform thickness cut to provide two wave-like slots, each of uniform width throughout its length, forming between them an anchoring bar for one end of the belt, said bar being supported at opposite ends and deflected from the plane of the plate and the plate having the side opposite the bar concaved to deflect the outer walls of the slots at angles to the plane of the plate so that sharp corners are provided to bite into the belt, the waves of the two slots being opposed, and a belt having one end secured about the anchoring bar and having a portion slidable through both slots over that portion of the belt secured about the anchoring bar.

EDWIN S. MIX.